(12) United States Patent
Han et al.

(10) Patent No.: US 11,238,194 B2
(45) Date of Patent: Feb. 1, 2022

(54) STRUCTURAL DESIGN METHOD OF PRODUCT

(71) Applicant: SOUTH UNIVERSITY OF SCIENCE AND TECHNOLOGY OF CHINA, Guangdong (CN)

(72) Inventors: Pinlian Han, Guangdong (CN); Kun Zhang, Guangdong (CN)

(73) Assignee: SOUTH UNIVERSITY OF SCIENCE AND TECHNOLOGY OF CHINA, Guangdong (CN)

( * ) Notice: Subject to any disclaimer, the term of this patent is extended or adjusted under 35 U.S.C. 154(b) by 580 days.

(21) Appl. No.: 16/071,005

(22) PCT Filed: Nov. 3, 2017

(86) PCT No.: PCT/CN2017/109255
§ 371 (c)(1),
(2) Date: Jul. 18, 2018

(87) PCT Pub. No.: WO2018/082642
PCT Pub. Date: May 11, 2018

(65) Prior Publication Data
US 2019/0026415 A1 Jan. 24, 2019

(30) Foreign Application Priority Data

Nov. 4, 2016 (CN) .......................... 201610962099.2
Nov. 4, 2016 (CN) .......................... 201610962100.1
(Continued)

(51) Int. Cl.
*G06F 30/23* (2020.01)
*B33Y 50/02* (2015.01)
(Continued)

(52) U.S. Cl.
CPC .............. *G06F 30/23* (2020.01); *B33Y 50/02* (2014.12); *G06F 30/17* (2020.01); *B33Y 10/00* (2014.12);
(Continued)

(58) Field of Classification Search
CPC ......... B33Y 50/02; B33Y 10/00; G06F 30/23; G06F 30/17
See application file for complete search history.

(56) References Cited

U.S. PATENT DOCUMENTS

2012/0237791 A1* 9/2012 Lin ..................... H01L 23/3732
428/634
2014/0037873 A1 2/2014 Cheung et al.

FOREIGN PATENT DOCUMENTS

CN 104658396 A 5/2015
CN 205078695 U 3/2016
(Continued)

OTHER PUBLICATIONS

Deaton, J.D., Grandhi, R.V. A survey of structural and multidisciplinary continuum topology optimization: post 2000. Struct Multidisc Optim 49, 1-38 (2014). https://doi.org/10.1007/s00158-013-0956-z (Year: 2014).*
(Continued)

*Primary Examiner* — Omar F Fernandez Rivas
*Assistant Examiner* — Pursottam Giri
(74) *Attorney, Agent, or Firm* — Bond Schoeneck & King, PLLC; George McGuire (57) ABSTRACT

A structural design method of a product is provided. The method includes obtaining a preliminary design of a subsurface mesh structure by filling a body model of the product with spherical cells at preset positions of the body model and performing an finite element analysis and optimization; and optimizing, through a design method for optimizing func-
(Continued)

tions, filling features of the spherical cells based on a simulation analysis so that the structure of the product satisfies a preset target.

4 Claims, 6 Drawing Sheets

(30) Foreign Application Priority Data

Nov. 4, 2016 (CN) .......................... 201610964724.7
Nov. 4, 2016 (CN) .......................... 201610964738.9
Nov. 4, 2016 (CN) .......................... 201610965886.2

(51) Int. Cl.
| | | |
|---|---|---|
| *G06F 30/17* | (2020.01) | |
| *B33Y 10/00* | (2015.01) | |
| *G06F 111/06* | (2020.01) | |
| *G06F 111/10* | (2020.01) | |
| *G06F 119/08* | (2020.01) | |
| *G06F 119/10* | (2020.01) | |

(52) U.S. Cl.
CPC ....... *G06F 2111/06* (2020.01); *G06F 2111/10* (2020.01); *G06F 2119/08* (2020.01); *G06F 2119/10* (2020.01)

(56) References Cited

FOREIGN PATENT DOCUMENTS

| CN | 105877874 A | | 8/2016 |
|---|---|---|---|
| CN | 105912803 A | * | 8/2016 |
| CN | 105912803 A | | 8/2016 |
| CN | 106599348 A | | 4/2017 |
| CN | 106599349 A | | 4/2017 |
| CN | 106649975 A | | 5/2017 |
| CN | 106649976 A | | 5/2017 |
| CN | 105877874 B | * | 12/2017 |
| WO | 2018082642 A1 | | 5/2018 |

OTHER PUBLICATIONS

Baotong Li, Jun Hong, Xiangyang Tian, Generating optimal topologies for heat conduction by heat flow paths identification, International Communications in Heat and Mass Transfer, vol. 75,2016, pp. 177-182, ISSN 0735-1933, https://doi.org/10.1016/j.icheatmasstransfer. 2016.04.016. (Year: 2016).*
Thurier, P.F., Lesieutre, G., Frecker, M., & Adair, J.H. (2014). Two-material Topology Optimization for the Design of Passive Thermal Control Structures. (Year: 2014).*
International Search Report and Written Opinion Form PCT/ISA/210 and PCT/ISA/237, pp. 1-10, International Filing Date Nov. 3, 2017, dated Feb. 6, 2018.
RO/101 of PCT/CN2017/109255, pp. 1-4.

* cited by examiner

STRUCTURAL DESIGN METHOD OF PRODUCT

CROSS-REFERENCE TO RELATED APPLICATIONS

This application is the United States National Phase Entry under 35 U.S.C. 371 of PCT Application No. PCT/CN2017/109255 filed on Nov. 3, 2017, and relates and claims priority to Chinese patent application No. 201610964724.7, filed on Nov. 4, 2016; Chinese patent application No. 201610964738.9, filed on Nov. 4, 2016; Chinese patent application No. 201610962099.2, filed on Nov. 4, 2016; Chinese patent application No. 201610965886.2, filed on Nov. 4, 2016; and Chinese patent application No. 201610962100.1, filed on Nov. 4, 2016, the entire disclosure of each of which is incorporated herein by reference.

TECHNICAL FIELD

The present disclosure relates to techniques of structural design and, in particular, to a structural design method of a product.

BACKGROUND

A porous mesh structure has a broad application prospect because it is characterized by light weight, versatility and designability, has excellent mechanical properties such as high specific strength, high specific stiffness, high tenacity and high energy absorption, and has special properties such as shock absorption, heat dissipation, sound absorption, electromagnetic shielding and permeability. A porous structure with closed pores has a low heat transfer coefficient and may be used for heat insulation, and a porous structure with open pores has a flow channel and may be used for heat dissipation. Designability facilitates design optimization of mechanical and heat dissipation structures.

A topological optimization design method of a heat conduction channel uses a heat dissipation performance descriptive index based on a geometric average temperature as an objective function to construct an optimization model for a heat dissipation structure design and makes a sensitivity analysis of the objective function to obtain a conceptual design of a heat conduction channel characterized by distribution of optimal heat conduction material; and, while keeping structural features unchanged, enables distribution of materials with high heat conductivity to be simply regularized and to have a smooth boundary, so as to obtain a design of a heat conduction channel with high conductivity that facilitates engineering use.

3 dimensions (3D) printing is also known as rapid prototyping manufacturing or additive manufacturing. The principle of the 3D printing is described as follows. A 3D physical digital model (CAD file) is discretized into a sliced model, and then the sliced model is converted into a treading track of a print head, and materials are continuously added to the printout through the print head. With the materials being continuously added according to a printing track and being printed layer by layer, a physical printout is finally formed. Unlike subtractive manufacturing in the traditional manufacturing industry, the 3D printing follows an addition rule. The 3D printing directly converts a design in a computer into a model and directly manufactures parts or products without using traditional cutting tools, fixtures and machine tools. The 3D printing can directly convert a virtual digital physical model into a product, simplifying the production process, reducing material production costs and shortening the design and development cycle of the product. As a result, it is possible to produce any part with a complex structure. The 3D printing is also an important technical means of implementing designability of microstructures and performance of materials. Consumables used for the 3D printing include materials such as plastic, rubber, metal, powder, nylon, film, resin, paraffin, gypsum, nylon filament, titanium and ceramic. The 3D printing makes production of goods enter a new phase and makes organization mode of the production flat. The 3D printing has a potential for hugely emancipating the productive forces and thus can greatly improve social productivity.

In the related art, it is difficult to use additive manufacturing to mold light-weight and high-strength components and parts for some product structures like aero-engines.

SUMMARY

A structural design method of a product is provided, and solves a problem that it is difficult for a manufacturing technology in the related art to satisfy a design requirement and mold light-weight and high-strength components and parts.

The present disclosure provides a structural design method of a product, through which a subsurface mesh structure is obtained via filling spherical cells and performing a design for optimizing functions so that a product is molded via additive manufacturing.

Optionally, the structural design method includes steps described below.

In step S1, a body model of a product is filled with spherical cells at preset positions of the body model and a finite element analysis and optimization are performed so as to obtain a preliminary design of a subsurface mesh structure.

In step S2, filling features for the spherical cells are optimized via a design method for heat insulation and dissipation, a design method for an enhanced damping structure, a design method for a controllable failure structure, a design method for sound absorption and noise reduction and a design method for eliminating stress concentration.

In step S3, a further design of the subsurface mesh structure is obtained via topology optimization, mechanical analysis, vibration analysis and optimization, and application of gradient material and design of variable thickness.

Optionally, the design method for heat insulation and dissipation in step S2 includes designing an optimal heat conduction channel through a method of topology optimization; and constructing the optimal heat conduction channel by filling the product with the spherical cells or a topological structure of the spherical cell at designated positions.

Optionally, the design method for the controllable failure structure in step S2 includes steps described below.

In step B1, an original model is designed.

In step B2, a finite element analysis and a photo-elastic experiment analysis are performed on the original model under an actual working condition to obtain analysis data.

In step B3, the model is filled with the spherical cells at designated positions based on the analysis data and a porous material configured with the spherical cells is designed so that a preliminary model of the product is obtained.

In step B4, a mechanical analysis is performed on the preliminary model, and the spherical cells at a key deformation position are enabled to adopt a gradient material according to a requirement of the product.

Optionally, the design method for the sound absorption and noise reduction in step S2 includes steps described below.

In step C1, a design domain, a load, and a boundary condition are defined.

In step C2, the design domain is divided into finite element meshes and multiple variables are initialized.

In step C3, a finite element analysis is performed on each unit of the product by utilizing an optimization model, and an optimal porous structure capable of absorbing sounds and reducing noises is conceived based on the model. The optimization model is based on a homogenization calculation theory in combination with a structural configuration design and a material configuration design and has acoustic radiation power as a target.

In step C4, the product is filled with the spherical cells or the topological structure of the spherical cell at the designated positions thereof so that the optimal porous structure capable of absorbing sounds and reducing noises is constructed.

In step C5, a finite element analysis is performed on the product having an internal configuration being designed under a working condition required by the design so that stress distribution and mechanical property related parameters of the product are obtained.

In step C6, the mechanical parameters obtained in step C5 are enabled to undergo data analysis, induction and reorganization so that systematic and comprehensive mechanical problems and optimization guidance are obtained. The material and the configuration of the spherical cells are changed so that a strength requirement of the product is satisfied.

In step C7, a computer simulation analysis and a related test verification are performed on the structure designed in step C6.

Optionally, the design method for eliminating the stress concentration in step S2 includes steps described below.

In step D1, a physical model and a working condition are acquired, and a stress concentration problem is found via an analysis so that an action scope, a stress concentration coefficient and physical parameters regarding a damage degree to a material are obtained.

In step D2, according to the working condition and the stress concentration problem acquired in step D1, for an area where stress concentration has approached or exceeded a material bearing threshold, the subsurface mesh structure based on the spherical cells is distributed in a surrounding area according to a rule obtained from calculations and experiments, so that the stress is dispersed out of a concentration position; and for an area where the stress concentrates but is lower than the material bearing threshold, a subsurface is designed in this area and an area around this area to prevent a point where the stress concentrates.

Optionally, the design method for the enhanced damping structure in step S2 includes providing a porous unit between two substrates, where the porous unit is at least one of a sphere, a spherical shell derived from the sphere, a spherical shell whose surface contains pores, and a spherical topological structure, and the substrates are plate-shaped.

Optionally, the design method for the controllable failure structure further includes steps described below.

In step B5, for the changes that have been made, allocation is made reasonably and the spherical cells are changed in an area adjacent to the area where the material is changed so that a later model of the product is formed.

In step B6, a finite element analysis and a photo-elastic experiment analysis are performed on the model whose material has been changed to determine whether the strength decreases significantly after the material is changed. If the strength performance index does not satisfy the design requirement, step B4 and step B5 are repeated until the model in step B5 satisfies the design requirement, so that the final model of the product is obtained.

Optionally, the design method for the heat insulation and dissipation in step S2 includes steps described below.

In step A1, a design domain, a load, and a boundary condition are defined.

In step A2, a heat conduction area is divided into finite element meshes and multiple variables are initialized.

In step A3, a finite element analysis is performed on each unit of the product by using a SIMP-based topology optimization method, a temperature field is solved and an optimal heat conduction channel is designed.

In step A4, the product is filled with the spherical cells or the topological structure of the spherical cell at the designated positions so that the optimal heat conduction channel is constructed and the product has good heat dissipation performance.

In step A5, a finite element analysis is performed on the product having an internal configuration being designed under a working condition required by the design so that stress distribution and mechanical property related parameters of the product are obtained.

In step A6, the mechanical parameters obtained in step A5 are enabled to undergo data analysis, induction and reorganization so that systematic and comprehensive mechanical problems and optimization guidance are obtained. The material and the configuration of the spherical cells are changed so that a strength requirement of the product is satisfied.

In step A7, a computer simulation analysis and a related test verification are performed on the structure designed in step A6.

Optionally, a structure matrix including a three-dimensional position of a center and a radius of a corresponding spherical cell is constructed according to the obtained subsurface mesh structure, and a 3D printing technology is used to produce products in batches.

A structural design method of a product provided by the present disclosure includes:

obtaining a preliminary design of a subsurface mesh structure by filling a body model of the product with spherical cells at preset positions of the body model and performing an finite element analysis and optimization; and optimizing, through a design method for optimizing functions, filling features of the spherical cells based on a simulation analysis so that the structure of the product satisfies a preset target.

Optionally, after the optimizing filling features of the spherical cells based on a simulation analysis, the method further includes:

changing a material and the filling features of the spherical cells through topology optimization, mechanical analysis, and vibration analysis and optimization to achieve a design of the subsurface mesh structure.

Optionally, the design method for optimizing functions includes at least one of a design method for heat insulation and dissipation, a design method for an enhanced damping structure, a design method for a controllable failure structure, a design method for sound absorption and noise reduction and a design method for eliminating stress concentration.

Optionally, the filling features of the spherical cells include at least one of a shape, a size and an arrangement of the spherical cells.

Optionally, the design method for heat insulation and dissipation includes: designing feature parameters of a heat conduction channel through a method of topology optimization; filling the body model of the product with the spherical cells at the preset positions of the body model based on the feature parameters of the heat conduction channel to construct the heat conduction channel.

Optionally, the design method for the controllable failure structure includes:
performing a finite element analysis and photo-elastic experiment analysis on the body model of the product under an actual working condition to obtain analysis data;
filling the body model of the product with the spherical cells at the preset positions of the body model based on the analysis data, and designing a porous material configured with the spherical cells to obtain a preliminary model of the product; and
performing a mechanical analysis on the preliminary model, and enabling the spherical cells at a key deformation position to adopt a gradient material according to a requirement of the product.

Optionally, the design method for sound absorption and noise reduction includes:
defining a design domain, a load type, and a preset boundary condition of a bearing load of the body model of the product; and dividing the design domain into finite element meshes and initializing a plurality of variables;
performing a finite element analysis on the design domain by utilizing an optimization model, and conceiving a porous structure capable of absorbing sounds and reducing noises based on the model, where the optimization model is based on a homogenization calculation theory in combination with a structural configuration design and a material configuration design and has acoustic radiation power as a target;
filling the body model of the product with the spherical cells at designated positions of the body model to construct the porous structure capable of absorbing sounds and reducing noises;
performing the finite element analysis on the body model of the product having the porous structure under a working condition required by the design to obtain stress distribution and mechanical property related parameters of the product;
changing a material configuration of the spherical cells according to the mechanical property related parameters so that the material configuration reaches a preset strength requirement; and
performing a computer simulation analysis and a related test verification on the material configuration to verify whether the material configuration reaches the preset strength requirement.

Optionally, the design method for eliminating stress concentration includes:
acquiring the body model of the product and a working condition, and performing an analysis to find a stress concentration problem and obtain an action scope, a stress concentration coefficient and physical parameters regarding a damage degree to a material; and
based on the working condition acquired and the stress concentration problem found, for a first area where stress concentration has approached or exceeded a material bearing threshold, distributing the subsurface mesh structure based on the spherical cells in an area around the first area according to a rule obtained from calculations and experiments, so as to disperse stress out of a concentration position; and for a second area where the stress concentrates but is lower than the material bearing threshold, a subsurface is designed in an area around the second area to prevent a point where the stress concentrates.

Optionally, the design method for the enhanced damping structure includes: providing the spherical cell (2) between two substrates (1) of the product, where the spherical cell (2) is at least one of a sphere, a spherical shell, a spherical shell whose surface contains pores, and a spherical topological structure, and the substrates (1) are plate-shaped.

Optionally, after the enabling the spherical cell at a key deformation position to adopt a gradient material according to a requirement of the product, the method further includes:
changing the filling features of the spherical cells in an area adjacent to the area where the gradient material is adopted so as to form a later model of the product; and
performing the finite element analysis and photo-elastic experiment analysis on the later model to determine whether a reduced strength value is greater than a preset strength value after the gradient material is adopted; and if a strength performance index does not satisfy a preset design requirement, repeating the mechanical analysis of the preliminary model, enabling the spherical cells at the key deformation position to adopt the gradient material according to the requirement of the product, and changing the filling feature of the spherical cells in the area adjacent to the area where the gradient material is adopted until an improved model satisfies the preset design requirement, so as to obtain a final model of the product.

Optionally, the design method for heat insulation and dissipation includes:
defining a design domain, a load type, and a preset boundary condition of a bearing load of the body model of the product;
dividing the design domain into finite element meshes and initializing a plurality of variables; and performing a finite element analysis on the design domain divided into the finite element meshes via a topology optimization method based on Solid Isotropic Material with Penalization (SIMP) and solving a temperature field to obtain a position parameter of a preset heat conduction channel;
filling the body model of the product with the spherical cells or a topological structure of the spherical cells based on the position parameter to construct the preset heat conduction channel so that the product has a preset degree of heat dissipation performance;
performing the finite element analysis on the product having an internal configuration being designed under a working condition required by the design to obtain stress distribution and mechanical property related parameters of the product;
changing a material configuration of the spherical cells according to the mechanical property related parameters so that the material configuration reaches a preset strength requirement; and
performing a computer simulation analysis and a related test verification on the material configuration.

Optionally, the structural design method of a product further includes constructing a structure matrix of a three-dimensional position of a center of a corresponding spherical cell and a radius of the spherical cell according to the obtained subsurface mesh structure, and manufacturing the product by using a 3D printing technology.

1The structural design method of a product according to the present disclosure is an active design method. That is, before a product is manufactured, a subsurface network structure is obtained by filling spherical cells and performing designs for optimizing functions, and a light-weight and high-strength product is molded via additive manufacturing. Therefore, the quality of the product is greatly increased, and the product has functions such as heat insulation and dissipation as well as sound absorption and noise reduction. Meanwhile, stress concentration and failure are avoided to a large extent, and the product has a higher strength, causing a lower failure rate and better performance, especially for components and parts of aero-engines.

DETAILED DESCRIPTION

Figure 1:
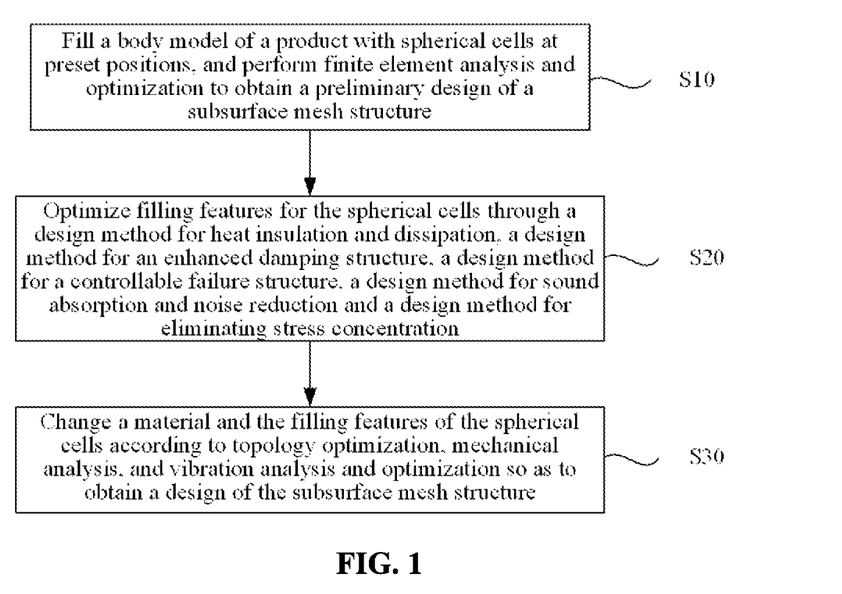
FIG. 1 is a flow diagram I of a structural design method of a product according to an embodiment.
Figure 2:
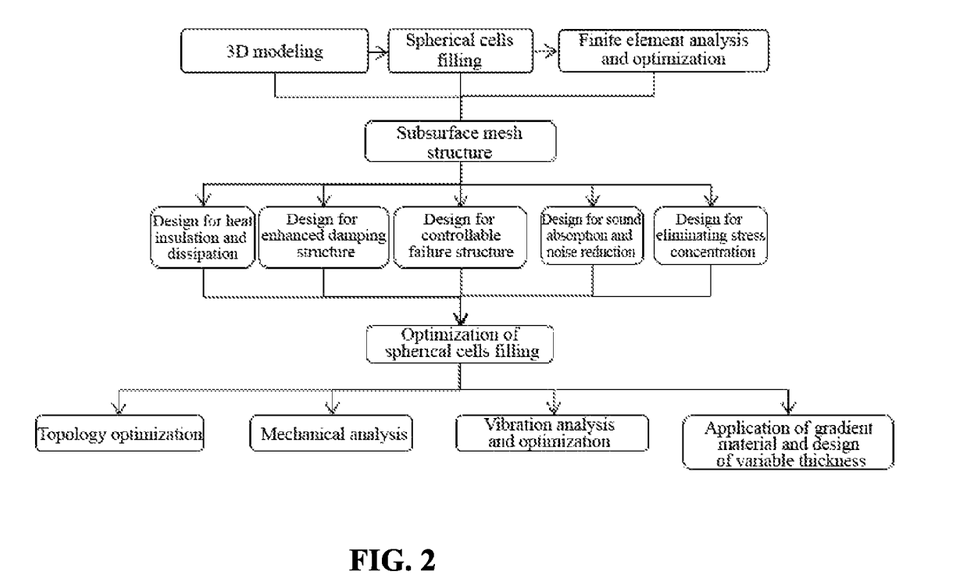
FIG. 2 is a flow diagram II of a structural design method of a product according to an embodiment.

The present embodiment provides a structural design method of a product. The method is applicable to design a large mechanical product having extremely high requirements for strength and light weight in fields such as aerospace, and is also applicable to design precision parts such as parts of an aero-engine (for example, blades) in fields such as precise machining. As illustrated in FIGS. 1 and 2, the structural design method of a product includes steps S10 to S30 described below.

In step S10, a body model of a product is filled with spherical cells at preset positions of the body model and a finite element analysis and optimization are performed so as to obtain a preliminary design of a subsurface mesh structure.

A subsurface refers to optimizing mechanical properties and physical properties such as stress distribution, stiffness, strength and heat conduction of a product with a constant geometric shape by changing an internal configuration of the product in an internal space of the product.

Figure 8:
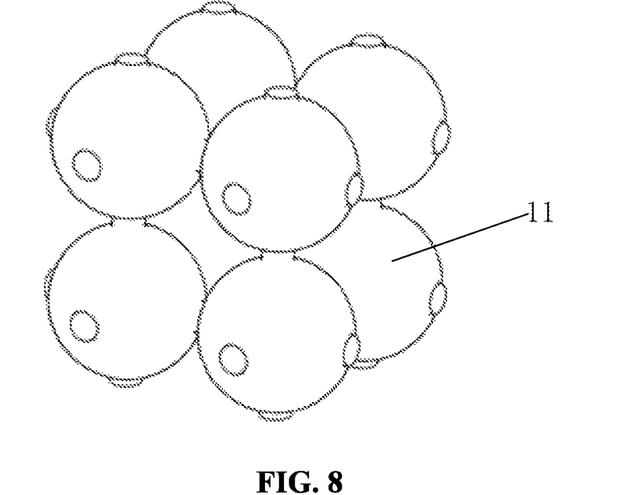
FIG. 8 is a structural diagram of a spherical cell according to an embodiment.
Figure 9:
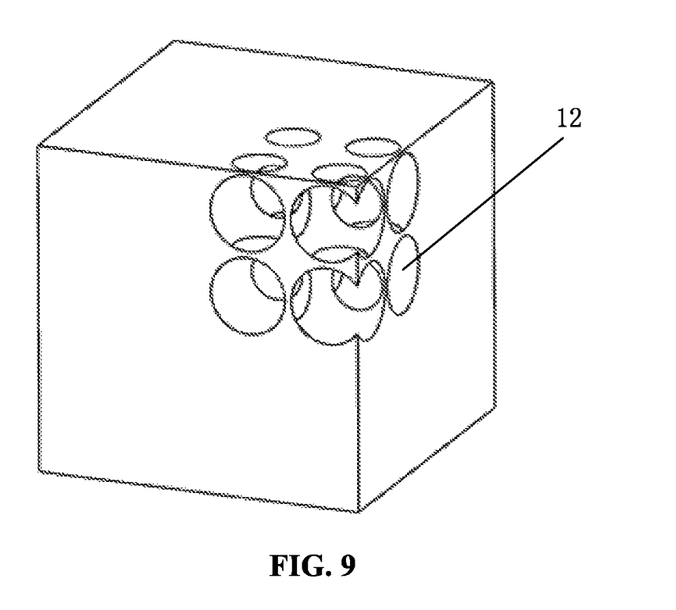
FIG. 9 is a structural diagram of another spherical cell according to an embodiment.

In the present embodiment and other embodiments, the spherical cells include at least one of the following geometric objects: a sphere 11 (referring to FIG. 8), a spherical shell derived from the sphere, a spherical shell 12 (referring to FIG. 9) whose surface contains pores and a spherical topological structure. A design of the spherical cell may refer to designing the types of the spherical cells and designing distribution features of the spherical cells. The types of the spherical cells include a solid sphere, a spherical shell whose surface contains pores and the like. The distribution features include mathematical parameters of the spherical cell, e.g., the 3D coordinates of the spherical cell.

In step S20, filling features for the spherical cells are optimized via a design method for heat insulation and dissipation, a design method for an enhanced damping structure, a design method for a controllable failure structure, a design method for sound absorption and noise reduction and a design method for eliminating stress concentration.

Optionally, the filling features for the spherical cells include at least one of the followings of the spherical cells: a shape, a size and an arrangement.

In step S30, a material and the filling features of the spherical cells are changed according to topology optimization, mechanical analysis, and vibration analysis and optimization so as to obtain a design of the subsurface mesh structure.

Optionally, based on the above steps, the method further includes manufacturing the product via additive manufacturing so that the quality of the product is greatly improved. The product is characterized by light weight and high strength because it adopts a porous subsurface mesh structure filled with the spherical cells. Further, the product has functions such as heat insulation and dissipation as well as sound absorption and noise reduction. Meanwhile, the product is capable of avoiding stress concentration and failure to a large extent, and has a lower failure rate, a higher strength and better performance, especially for components and parts of aero-engines.

In the present embodiment, to achieve functions such as heat insulation and dissipation as well as sound absorption and noise reduction and to avoid problems such as stress concentration and product failure, the structure of the product is analyzed and optimized, a structure matrix including three-dimensional positions of the centers of the spherical cells in the subsurface mesh structure as well as the radiuses of the spherical cells is established, and the product is manufactured by the 3D printing technology. The product failure may refer to a fault, a function failure or the like of the product.

Figure 3:
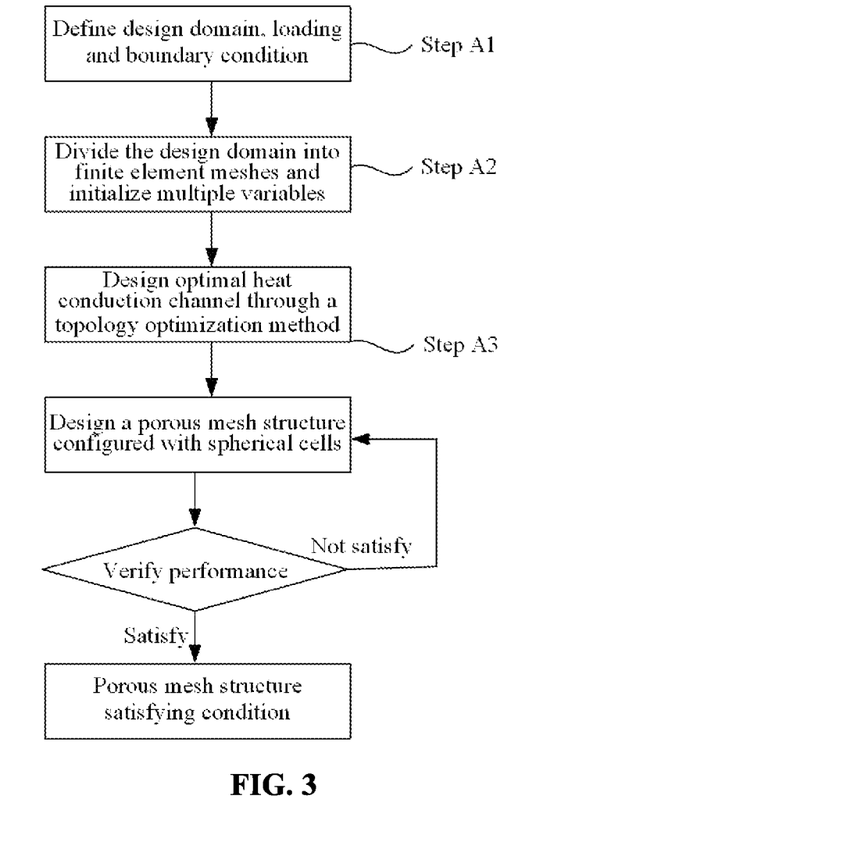
FIG. 3 is a flow diagram of a design method for heat insulation and heat dissipation according to an embodiment.

Optionally, as illustrated in FIG. 3, the design method for heat insulation and dissipation in step S20 includes steps described below.

In step A1, a design domain, a load type, and a preset boundary condition of a bearing load of the body model of the product are defined.

The design domain refers to a physical area in the body model of the product where a design of heat insulation and dissipation needs to be performed.

In step A2, the design domain is divided into finite element meshes, and a plurality of variables are initialized.

The variables may refer to general variables of the finite element meshes, such as shape, size of the meshes and other parameters.

In step A3, a finite element analysis is performed on the design domain being divided into finite element meshes through a topology optimization method based on Solid Isotropic Material with Penalization (SIMP) to solve a temperature field, thereby obtaining a position parameter of an optimal heat conduction channel.

In step A4, the body model of the product is filled with the spherical cells based on the position parameter so that the optimal heat conduction channel is constructed and the product has good heat dissipation performance.

In step A5, a finite element analysis is performed on the product with an internal configuration thereof being designed under a working condition required by the design so that stress distribution and mechanical property related parameters of the product are obtained.

In step A6, the material and the configuration of the spherical cells are changed according to the mechanical parameters obtained in step A5, so that a strength requirement of the product is satisfied.

In step A7, a computer simulation analysis and a test verification are performed on the structure designed in step A6. Step A7 may include steps described below.

In step A71, basic physical and mechanical properties of the product manufactured through 3D printing are tested via experiments. The basic physical and mechanical properties include tensile strength, elasticity modulus, Brinell hardness, Poisson's ratio, yield strength, tangent modulus and density.

In step A72, a miniature test platform is set up according to an actual working condition of the product, an uploading test on the product is conducted on the test platform by gradually increasing the load from zero, and deformation distribution and deformation amount variation of the product are tested under different loading conditions through a resistance strain gauge method. The miniature test platform refers to a test platform operable in a laboratory and diminished from a full-scale test platform required by the actual working condition.

In step A73, with the basic physical and mechanical properties and types of the basic physical and mechanical properties of the product tested in step A71 and different loading conditions in step A72 being used as basic input values, a stress simulation analysis is performed on the product by using a finite element analysis software. The result of the simulation analysis is compared with the result of the actual test in step A72. If the conformity is greater than 90%, the process proceeds to step A74. Otherwise, the process returns to step A73 to adjust the types of the basic physical and mechanical properties and the loading conditions and to perform the simulation analysis again until the conformity between theoretical result and experimental result satisfies a preset requirement.

In step A74, with the loading conditions and the types of the basic physical and mechanical properties adjusted in step A73 and the basic physical and mechanical properties of the material in step A71 being used as input parameters, a stress simulation analysis is performed on the product by using the finite element analysis software, and the load is gradually increased from zero to simulate and analyze the strength of the product. In this way, it is deduced that the corresponding product will not be over-deformed and undergo failure under the actual working condition and can bear corresponding load.

The loading conditions in above steps A71, A72, A73 and A74 refer to magnitude, direction, action point and distribution of the loading force applied.

In this method, the heat dissipation performance of the product is improved by designing the optimal heat conduction channel through the topology optimization method, or the heat dissipation performance of the product is improved by changing the pore size of the porous structure. Then, the mechanical properties of the product such as the structural strength, compression resistance, abrasion resistance are improved by designing the porous subsurface mesh structure so that the mechanical properties of the structure such as mass distribution, stiffness distribution, load path, damping distribution, failure distribution, modal distribution, heat transfer distribution, life distribution are changed according to the structure utilization requirement without changing the outline of the structure. Therefore, the porous mesh structure that has good heat insulation or dissipation performance and satisfies external stress requirement is constructed.

In the design method for heat insulation and dissipation, the optimal heat conduction channel is constructed through the topology optimization method, and the heat conduction channel is constructed by filling the product with spherical cells and topological structure. Under the premise that better heat conduction performance is satisfied, the requirement for external stress of the product is satisfied by changing structural properties of the spherical cells. For example, in an area where the stress is concentrated, the strength of the internal configuration is enhanced, e.g., by using a solid sphere or a half-solid sphere. In an area where the stress is dispersed, the strength of the internal configuration is reduced, e.g., by using a hollow sphere. The porous structure can effectively suppress three basic heat transfer modes, i.e., conduction, convection and radiation, due to an extremely low bulk density and a large number of internal nanopores, and can significantly reduce solid-state heat conductivity because the internal configuration has low density. While maintaining the porous structure, the sizes of the pores are minimized as much as possible, so that heat movement of gas molecules is restrained when the diameter of the pores is less than the mean free path 70 nm of air at normal temperature. Thus, gas convection heat conduction can be omitted. The heat insulation property of the product can be enhanced by designing a reasonable structure. The normal temperature may be 25 degrees centigrade to 35 degrees centigrade.

Figure 4:
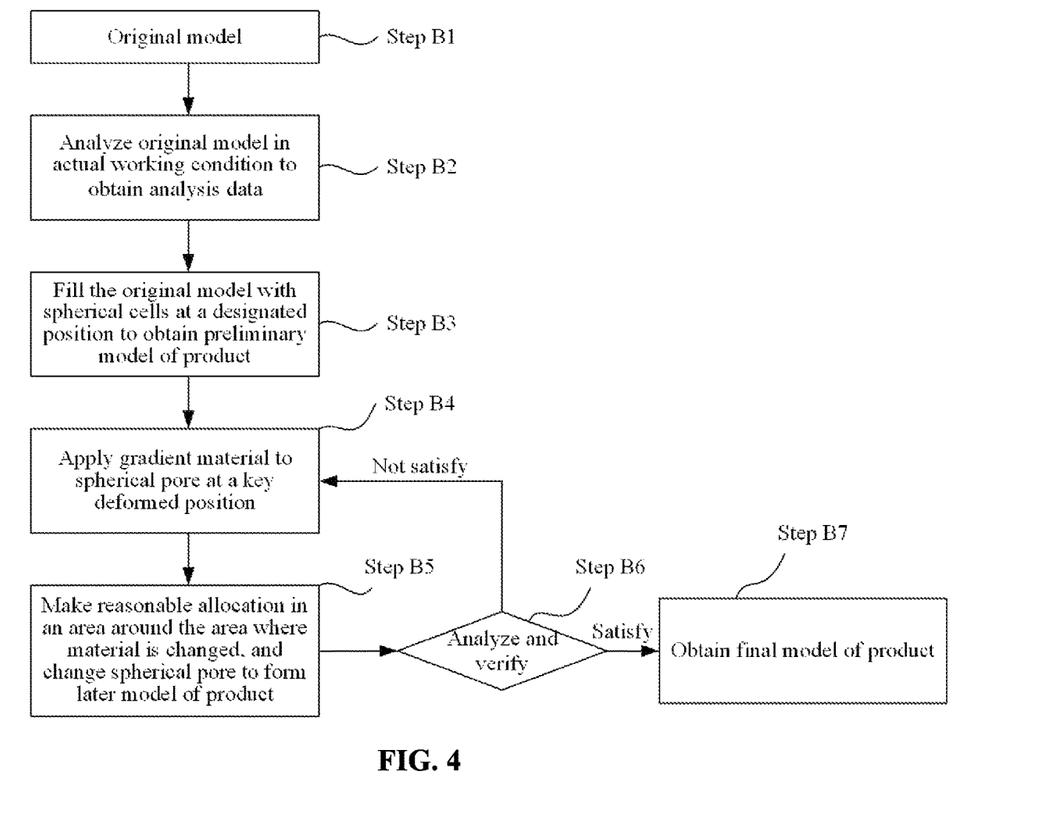
FIG. 4 is a flow diagram of a design method for a controllable failure structure according to an embodiment.

Optionally, as illustrated in FIG. 4, the design method for the controllable failure structure in step S20 includes steps described below.

In step B1, a body model of the product is provided.

In step B2, a finite element analysis and a photo-elastic experiment analysis are performed on the body model of the product under an actual working condition to obtain analysis data.

In step B3, the body model of the product is filled with the spherical cells at the preset positions of the body model based on the analysis data, thereby designing a porous material configured with spherical cells and obtaining a preliminary model of the product.

In step B4, a mechanical analysis is performed on the preliminary model, and the spherical cell located at a key deformation position is enabled to use a gradient material according to a requirement of the product. The key deformation position refers to a key area where the deformation of the product is restricted, including a connection point between spherical cells, a central spherical cell and the like. The gradient material may be one of the following materials: the material property of the spherical cells along a loading direction shifts from high-stiffness and low-strength at two ends to common or high-strength in the middle; the material property of the spherical cell shifts from high-stiffness and low-strength at the connection points between spherical cells to common or high-strength in spherical pores.

Depending on different product design requirements and actual working conditions, different gradient materials are selected and the material in the key deformation area is replaced. Via characteristics of heterogeneous material, in the condition that mechanical properties are satisfied, only part of the structure first destroys and absorbs energy, while the structure as a whole breaks in a preset direction. In this way, the safety problem is solved when a product working in complex and harsh conditions undergoes failure.

In step B5, the filling features of the spherical cells in an area adjacent to the area, where the gradient material is adopted, are changed, so that stress concentration occurred due to replacement of the material is avoided and a later model of the product is formed.

In step B6, a finite element analysis and a photo-elastic experiment analysis are performed on the later model to determine whether the strength decreases significantly after the gradient material is adopted. If the performance index such as the strength does not satisfy the design requirement, steps B4, B5 are repeated until the model in step B5 satisfies the design requirement of the failure structure, so that a final model of the product is obtained.

The design method for the controllable failure structure may further include step B7. In step B7, the final model in step B6 is manufactured through the 3D printing technology, i.e., a high-safety product with a directional failure function is obtained.

Through this design method for the controllable failure structure, types of the materials at different positions are reasonably designed so that the product designed undergoes failure in a controllable way when the stress applied to the product beyond a design scope. Therefore, the safety problem that the product undergoes failure when the stress applied to the product beyond the design scope is solved, ensuring safety and controllability when a mechanical product working in complex conditions undergoes failure, and improving overall safety performance of the product.

Figure 5:
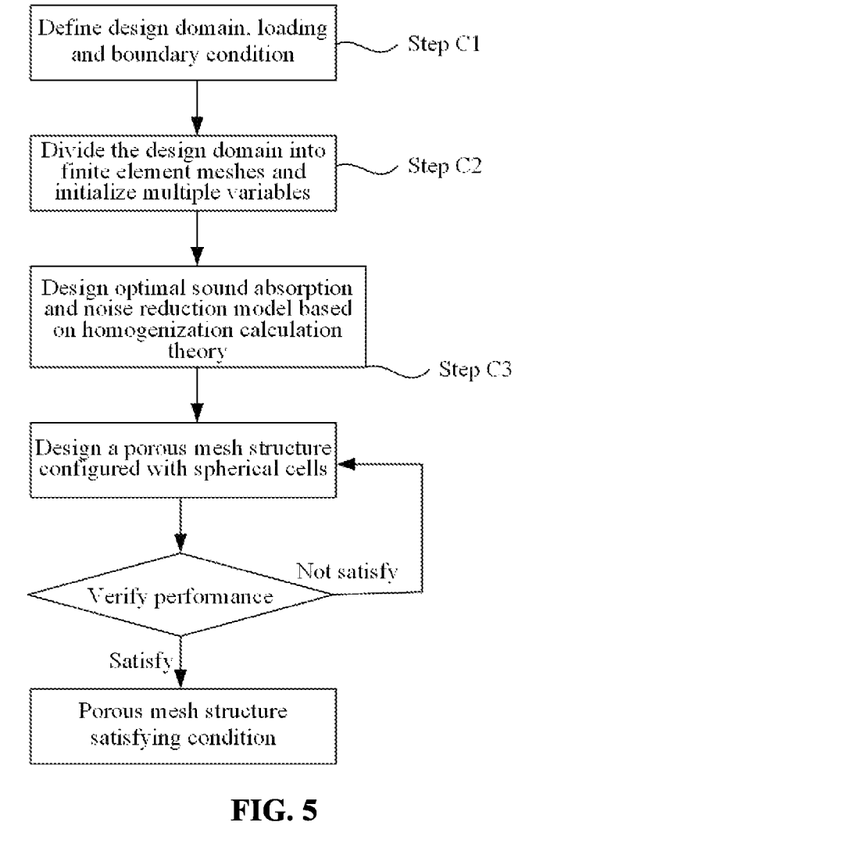
FIG. 5 is a flow diagram of a design method for sound absorption and noise reduction according to an embodiment.

Optionally, as illustrated in FIG. 5, the design method for sound absorption and noise reduction in step S20 includes steps described below.

In step C1, a design domain, a load type, and a preset boundary condition of a bearing load of a body model of the product are defined.

The design domain refers to a physical area in the product where a design for heat insulation and dissipation needs to be performed. The load may include temperature, pressure and the like.

In step C2, the design domain is divided into finite element meshes, and a plurality of variables are initialized.

The variables may refer to general variables of the finite element meshes, such as shape, size of the mesh and other parameters.

In step C3, a finite element analysis is performed on the design domain by utilizing an optimization model, and an optimal porous structure capable of absorbing sounds and reducing noises is conceived based on the optimization model. The optimization model is based on a homogenization calculation theory in combination with a structural configuration design and a material configuration design, and has acoustic radiation power as a target. Optionally, the optimal porous structure capable of absorbing sounds and reducing noises is conceived based on a JCA model.

The JCA model, i.e., a Johnson-Champoux-Allard model, refers to an acoustic model for simulating a sound absorption process in a porous medium.

In step C4, the body model of the product is filled with spherical cells or a topological structure of the spherical cell at designated positions of the body model to construct the optimal porous structure capable of absorbing sounds and reducing noises, so that the product has better performances of sound absorption and noise reduction.

In step C5, a finite element analysis is performed on the body model of the product having the porous structure under a working condition required by the design to obtain stress distribution and mechanical property related parameters of the product.

In step C6, the material and the configuration of the spherical cells are changed based on the mechanical parameters obtained in step C5, so that a strength requirement of the product is satisfied.

In step C7, a computer simulation analysis and a test verification are performed on the structure designed in step C6 to verify whether the product satisfies a preset requirement for strength design.

Step C7 may further include steps described below.

In step C71, basic physical and mechanical properties of the product manufactured through the 3D printing are tested via experiments. The basic physical and mechanical properties include tensile strength, elasticity modulus, Brinell hardness, Poisson's ratio, yield strength, tangent modulus and density.

In step C72, a miniature test platform is set up according to an actual working condition of the product, an uploading test on the product is conducted on the test platform by gradually increasing the load from zero, and deformation distribution and deformation amount variation of the product are tested under different loading conditions through a resistance strain gauge method.

In step C73, with the basic physical and mechanical properties and types of the basic physical and mechanical property of the product tested in step C71 and different loading conditions in step C72 being used as basic input values, a stress simulation analysis is performed on the product by using a finite element analysis software. The result of the simulation analysis is compared with the actual test result in step C72. If the conformity is greater than 90%, the process proceeds to the next step. Otherwise, the process returns to the step C73 to adjust the types of the basic physical and mechanical properties and the loading conditions and to perform the simulation analysis again until the conformity between the theoretical result and experimental result satisfies the requirement, e.g., greater than 90%.

In step C74, with the loading conditions and the types of the basic physical and mechanical properties adjusted in step C73 and the basic physical and mechanical properties of the material in step C71 being used as input parameters, the stress simulation analysis is performed on the product by using the finite element analysis software. The load is gradually increased from zero to simulate and analyze the strength of the product. In this way, it is deduced that the corresponding product will not be over-deformed and undergo failure under the actual working condition and can bear corresponding load.

The loading conditions in steps C72, C73 and C74 refer to magnitude, direction, action point and distribution of the loading force applied.

In this method, the porous structure having good performance of sound absorption and noise reduction is constructed based on the homogenization calculation theory in combination with the structural configuration design and the material configuration design. Then, a porous subsurface mesh structure is designed to improve mechanical properties of the product such as the structural strength, compression resistance, abrasion resistance and add physical properties not possessed by a traditional structure such as high damping, so that the mechanical properties of the structure such as mass distribution, stiffness distribution, load path, damping distribution, failure distribution, modal distribution, heat transfer distribution, life distribution are changed according to the structure utilization requirement without changing the outline of the structure. Therefore, the porous mesh structure that has good performance of sound absorption and noise reduction and satisfies external stress requirement is constructed, thereby achieving the purpose of improving the performance of sound absorption and noise reduction, mechanical properties and physical properties.

Figure 6:
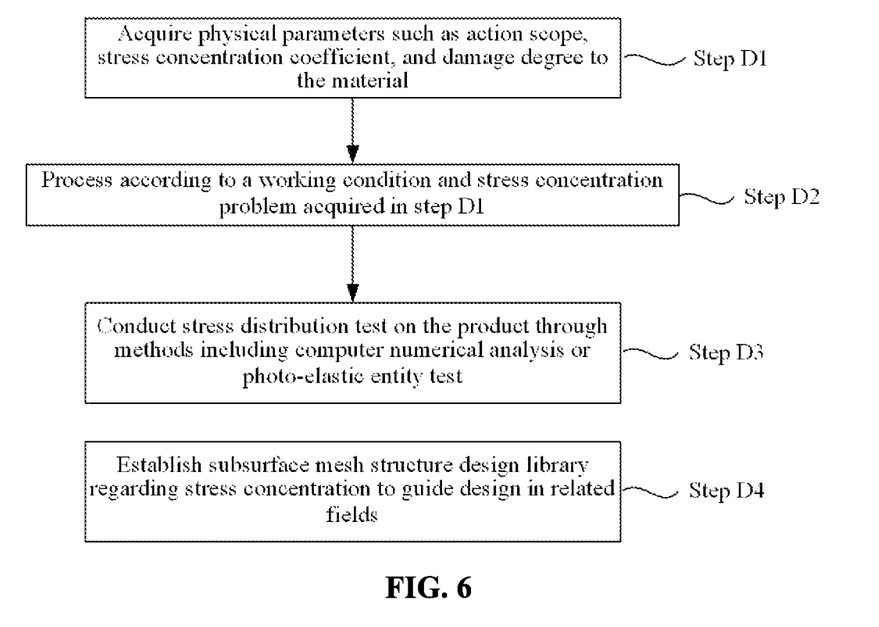
FIG. 6 is a flow diagram of a design method for eliminating stress concentration according to an embodiment.

Optionally, as illustrated in FIG. 6, the design method for eliminating stress concentration in step S20 includes steps described below.

In step D1, a body model of a product and a working condition are acquired to obtain a result regarding finite element analysis, and a stress concentration problem is found via the analysis to obtain an action scope, a stress concentration coefficient and physical parameters regarding a damage degree to a material.

In step D2, based on the working condition and the stress concentration problem acquired in step D1, with respect to a situation where stress concentration has approached or exceeded a material bearing threshold or the stress concentration coefficient is much high, since the product is impaired rapidly, a subsurface mesh structure based on spherical cells is distributed in an area around a strong-action area according to a rule obtained from calculation and experiments, so that the stress is dispersed out of a concentration position; with respect to a situation where the stress concentrates but is lower than the material bearing threshold, since the product is impaired gradually over a long time in an area, a subsurface is designed in this area and an area around this area to prevent a point where the stress concentrates.

In step D3, a stress distribution test is conducted on the product. Methods of the test include computer numerical analysis or photo-elastic entity test.

In step D4, steps D2 and D3 are repeated to continuously optimize the design scheme. After a certain number of design instances are accumulated, a subsurface mesh structure design library about stress concentration is established through induction and summarization to guide the design in related fields.

The method can solve a stress concentration problem in a large mechanical product whose outline is substantially fixed, and can be used to design the subsurface.

Figure 7:
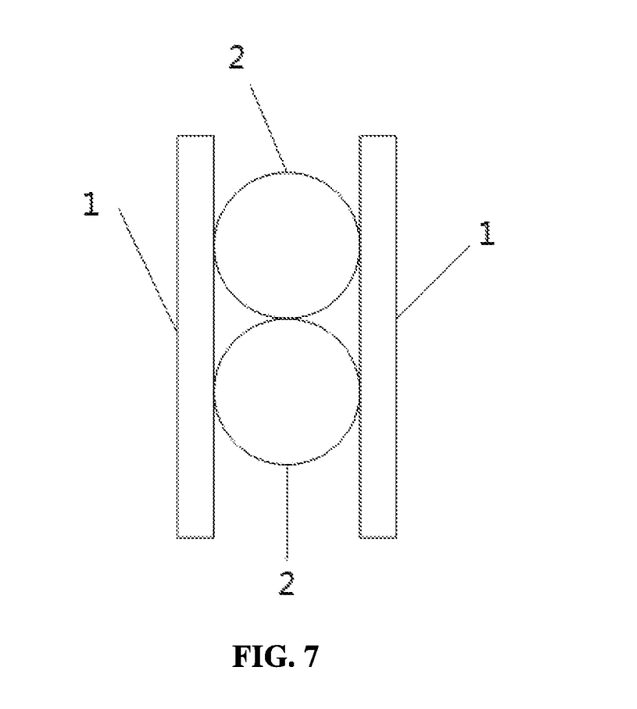
FIG. 7 is a structure diagram of an enhanced damping structure according to an embodiment.

Optionally, as illustrated in FIG. 7, step S20 includes providing porous spherical cells 2 are in a cavity formed by a substrate 1 of the product. Optionally, the spherical cells 2 are linearly or non-linearly arranged in the cavity.

Optionally, the substrate 1 is plate-shaped and may be a metal material with a thickness of 1 mm to 5 mm. Space between the substrates 1 is filled with the spherical cells 2. The spherical cell 2 is a metal structure with a height of 1 mm to 5 mm.

The spherical cells change damping distribution and attenuate vibration energy transferred by the structure.

INDUSTRIAL APPLICABILITY

According to the structural design method of a product provided by the present disclosure, before the product is manufactured, a subsurface mesh structure is obtained by filling spherical cells and performing the functional optimization design; and a light-weight and high-strength product is formed via additive manufacturing. Therefore, the quality of the product greatly is greatly increased so that the product has functions such as heat insulation and dissipation as well as sound absorption and noise reduction in advance. Meanwhile, the product has a higher strength because the stress concentration and failure are avoided to a large extent, and has a lower failure rate and better performance, especially for components and parts of aero-engines.

What is claimed is:

1. A structural design method of a product, applied to design large mechanical products and precision parts, comprising:
   obtaining a preliminary design of a subsurface mesh structure by filling a body model of the product with spherical cells at preset positions of the body model and performing, by a computer, an finite element analysis and optimization by running a finite element analysis software in the computer; and
   optimizing, by the computer, through a design method for optimizing functions, filling features of the spherical cells based on a simulation analysis so that the structure of the product satisfies a preset target;
   wherein the design method for optimizing functions comprises a design method for heat insulation and dissipation;
   wherein the filling features of the spherical cells comprise at least one of a shape, a size and an arrangement of the spherical cells;
   wherein the design method for heat insulation and dissipation comprises: designing feature parameters of a heat conduction channel through a method of topology optimization; filling the body model of the product with the spherical cells at the preset positions of the body model based on the feature parameters of the heat conduction channel to construct the heat conduction channel;
wherein the design method for heat insulation and dissipation comprises the following operations performed the computer:
   defining a design domain, a load type, and a preset boundary condition of a bearing load of the body model of the product;
   dividing the design domain into finite element meshes and initializing a plurality of variables, by running the finite element analysis software; and performing a finite element analysis on the design domain divided into the finite element meshes via a topology optimization method based on Solid Isotropic Material with Penalization (SIMP) and solving a temperature field to obtain a position parameter of a preset heat conduction channel;
   filling the body model of the product with the spherical cells or a topological structure of the spherical cells based on the position parameter to construct the preset heat conduction channel so that the product has a preset degree of heat dissipation performance;
   performing the finite element analysis on the product having an internal configuration being designed under a working condition required by the design to obtain stress distribution and mechanical property related parameters of the product;
   changing a material configuration of the spherical cells according to the mechanical property related parameters so that the material configuration reaches a preset strength requirement; and
   performing a computer simulation analysis, by running the finite element analysis software, and a related 3D printing test verification, by a 3D printing equipment on the material configuration.

2. The structural design method of a product according to claim 1, wherein after the optimizing filling features of the spherical cells based on a simulation analysis, the method further comprises:
   changing a material and the filling features of the spherical cells through topology optimization, mechanical analysis, and vibration analysis and optimization to achieve a design of the subsurface mesh structure.

3. The structural design method of a product according to claim 1, further comprising constructing a structure matrix of a three-dimensional position of a center of a corresponding spherical cell and a radius of the spherical cell according to the obtained subsurface mesh structure, and manufacturing the product by using a 3D printing technology.

4. The structural design method of a product according to claim 2, wherein the design method for optimizing functions comprises at least one of a design method for heat insulation and dissipation, a design method for an enhanced damping structure, a design method for a controllable failure structure, a design method for sound absorption and noise reduction and a design method for eliminating stress concentration.

\* \* \* \* \*